Nov. 14, 1933.                R. R. ROEMER                1,935,377
                            CONSTRUCTION SHORE
                   Filed Sept. 10, 1928      2 Sheets-Sheet 1

INVENTOR
Ralph R. Roemer
BY Harry P. Canfield
ATTORNEY

Nov. 14, 1933.   R. R. ROEMER   1,935,377
CONSTRUCTION SHORE
Filed Sept. 10, 1928   2 Sheets-Sheet 2
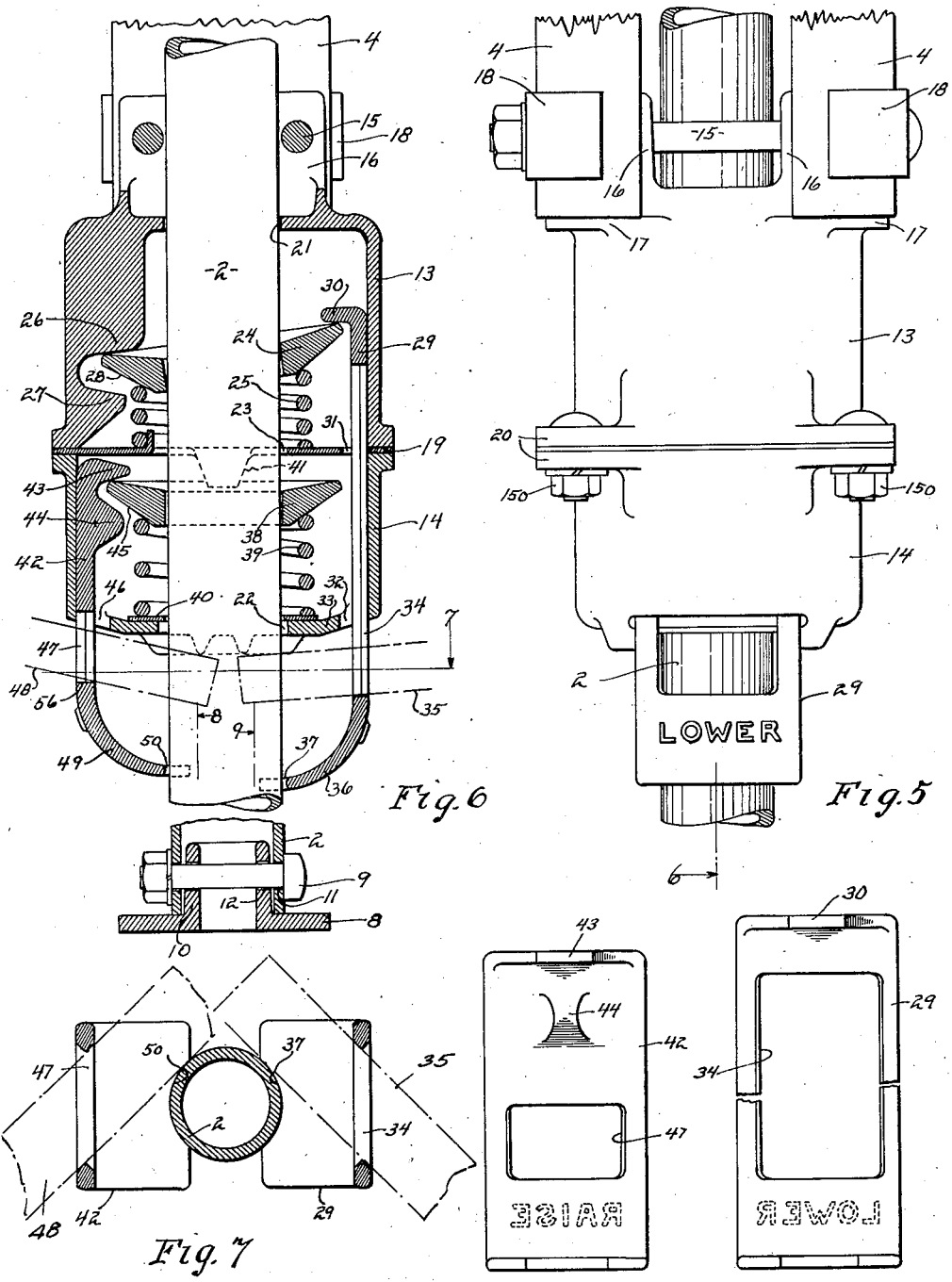

Patented Nov. 14, 1933

1,935,377

UNITED STATES PATENT OFFICE 1,935,377

CONSTRUCTION SHORE

Ralph R. Roemer, Cleveland, Ohio

Application September 10, 1928
Serial No. 304,885

17 Claims. (Cl. 254—106)

This invention relates to adjustable construction shores.

One of the objects of this invention is to provide an adjustable short, having the maximum of strength, rigidity and safety as a supporting column with the minimum of material in its construction.

Another object is to provide a shore constructed so as to be telescopic whereby it may be adjusted to greater or lesser overall lengths; and provided with means whereby the telescoped parts will be retained substantially in longitudinal or axial alignment at all adjustments when underload, and, particularly, at the greater adjusted lengths.

Another object is to provide in a shore, an improved clutch device whereby the shore may be quickly and easily adjusted to various desired lengths in the nature of a jack; and whereby the shore may be rigidly held at the adjusted lengths when a load is placed thereon.

Another object is to provide a shore clutch device, the clutch and jacking elements of which are so constructed and arranged that they may all be enclosed in a housing to protect them from injury and keep them clean, and thus insure their proper operation.

Another object is to provide a telescopic shore having an elevating or lowering clutch device which is positive and efficient in its action and yet so simple to operate as to be "fool proof" and to require no instruction of the operator.

Other objects will be apparent to those skilled in this art from the following description of an embodiment thereof and from the accompanying drawings illustrating the embodiment and in which, Fig. 1 is an elevational front view of a shore embodying my invention;

Fig. 5 is a view of a part of Fig. 1 drawn to a larger scale showing a clutch housing which I may employ;

Fig. 6 is a sectional view taken from the plane 6 of Fig. 5;

Fig. 7 is a sectional view taken from the plane 7 of Fig. 6;

Fig. 8 is an elevational view of one of the parts shown in Fig. 6 and taken from the plane 8 of Fig. 6;

Fig. 9 is a view similar to Fig. 8 of another part of Fig. 6 taken from the plane 9 of Fig. 6.

Figure 1:
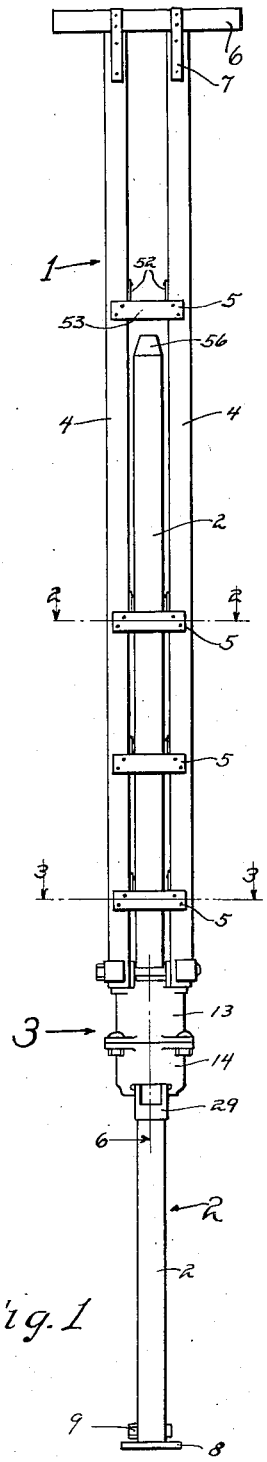
Figure 2:
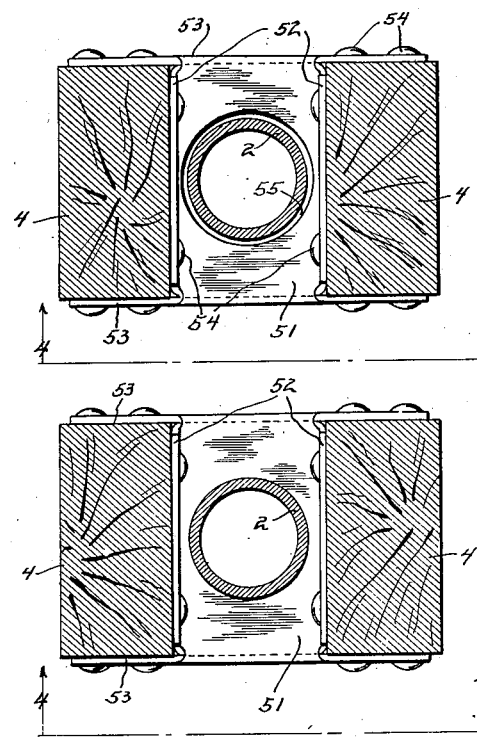
Fig. 2 is a horizontal sectional view taken from the plane 2—2 of Fig. 1 and drawn to a larger scale.

The invention illustrated and described herein is in some respects correlative to my pending application, Serial No. 305,394, filed September 12, 1928.

Referring to the drawings I show at 1, in general, the upper one of a pair of telescoping shore members; at 2, in general, the lower telescoping member of the pair; and at 3, in general, a clutch device.

The upper telescoping shore member 1, comprises a vertically arranged column or support, preferably composed of two parallel wood struts 4, 4, spaced apart and braced for rigidity by a series of braces 5, 5, to be described and surmounted by a head or cap 6 preferably of wood, secured to the struts 4 by straps 7.

The lower telescoping shore member 2 is preferably tubular as shown and circular in cross section. The lower end thereof is provided with a horizontal flange or foot 8 bolted thereto as at 9; the foot has also a tubular riser 10 in the center thereof which extends upwardly inside of the tubular member 2 and the bolt 9 passes through the holes 11 in the walls of the tubular member and through holes 12 in the riser. The holes are large enough to insure that the lower end of the tubular member 2 will be supported on the flange 8 and not on the bolt 9.

The clutch device 3 comprises a cage or housing composed of an upper portion 13 and a lower portion 14. The upper portion 13 is bolted by bolts 15 to the lower end of the wooden struts 4, lugs 16 and brackets or shelves 17 being provided on the housing member 13 for this purpose. U-shaped clamps 18 embrace the ends of the struts 4 being retained by the bolts 15 to prevent the wood of the struts from splitting when the shore is under load.

The housing members 13 and 14 are, in general, of cup shape, their open ends facing each other and abutting upon a partition member 19 preferably formed from sheet metal, and the upper and lower portions 13 and 14 and partition 19 are secured rigidly together to form an enclosing housing by bolts 150 and lugs 20 on the upper and lower portions. The housing thus formed surrounds the lower shore member 2 and together with the upper shore member 1 to which the housing is secured, is longitudinally, telescopically movable along the lower member 2, the upper housing member 13 being provided with a central bore 21 and the lower portion 14 with an opening 22 and the partition 19 with an opening 23 to admit the tubular member 2 therethrough.

In the upper housing portion 13, a canting plate or washer 24 is provided encircling the tubular member 2 and is pressed upwardly, as viewed in Fig. 6, by a compression spring 25, the lower end of which abuts upon the partition 19 and the upper end of which abuts on the lower face of the washer 24. The upward thrust of the spring 25 holds the washer 24 against a post or fulcrum 26 formed on the inner wall of the upper housing portion 13 and overhanging the outer edge or periphery of the washer. The thrust of the spring 25 causes the washer 24 to cant out of the horizontal as viewed in Fig. 6. A shoulder 27 is provided below and spaced from the fulcrum 26 and from the lower face 28 of the washer for a purpose to be described.

A hook device 29 having a lip 30 overhanging the edge of the washer 24 at a point opposite the fulcrum 26 is provided to rock the washer 24 back into or toward the horizontal position when desired for an operative purpose to be described and the body of the hook device extends downwardly through an aperture 31 in the partition 19 and on through an aperture 32 in the lower end or bottom 33 of the housing portion 14; and below the portion 14 the hook has an opening 34 through which a pinch bar or other tool 35 indicated in broken lines may be inserted and operated as a lever with the bottom 33 of the housing portion 14 as a fulcrum to pull the hook 29 downwardly and rock the plate 24. The lower end of the hook 29 is bent inwardly toward the tubular member 2 as at 36 and abuts against the tubular member at, substantially, a right angle, a circular notch 37 being provided in the extreme lower end, partially encircling the tubular member 2 whereby the movement of the hook device is guided on the tubular member and also prevented from swinging inwardly out of the vertical toward the tubular member when the lever 35 is operated as above described thus causing the body of the hook to move freely through the apertures 31 and 32. The hook 29 is further provided with the legend "Lower" to indicate its function.

In the lower housing portion 14 a second canting plate or washer 38 is provided encircling the tubular member 2 and pressed upwardly as viewed in Fig. 6 by compression spring 39 the lower end of which abuts upon a sealing or dust proof washer 40 the hole of which closely fits the tubular member 2 and which is supported on the lower floor 33 of the housing member 14. The upper end of the spring 39 abuts upon the lower face of the canting washer 38. The upward thrust of the spring 39 holds the washer 38 against two downwardly projecting lugs 41 formed on the partition 19 one only of which is shown in dotted line. The lugs 41 are disposed diametrically and symmetrically with respect to the washer 19 and the lower ends of the lugs 41 are squared off horizontally so that the thrust of the spring 39 holds the washer 38 normally in horizontal or uncanted position. A hook device 42 having a lip 43 overhanging the upper edge of the washer 38 and having a shoulder 44 adjacent to the lower face 45 of the washer is provided with a portion which extends downwardly through an aperture 46 in the housing portion 14. The hook device 42 has an opening 47 through which a pinch bar or other tool 48 indicated in broken lines, may be inserted, and operated as a lever upon the bottom of the portion 33 as a fulcrum to rock or tilt the washer 38 out of its normal horizontal position into a canted position to cause it to grip the tubular member 2 for a purpose to be described. The lower end of the hook device 42 is bent inwardly as at 49 and is provided with a circular notch 50 similarly to the hook device 29 and for the purposes described for the latter, and has the legend "Raise" to indicate its function.

The canting washers 24 and 38 may be duplicates and the springs 25 and 39 may be duplicates. The upper face of the washer 24 is dished in order that the fulcrum 26 may engage the washer only on the extreme outer edge thereof, and may apply the load transmitted to the fulcrum by the upper shore member 1 upon the washer in a substantially vertical direction and with the minimum of radial or tube crushing force. Engagement of the washer by the fulcrum 26 only upon the extreme outer edge also insures that the washer will always cant and grip the tubular member 2. The lower face of the washer 24 is conical and serves to center and locate the spring 25 and permits the use of an ordinary square ended cylindrical spring without axial distortion thereof. The cross sectional shape of the washer is generally triangular on a radial plane to require the minimum of material and weight for the maximum of strength, permitting the use of special, relatively inexpensive material. These and other particular features of the canting plate or washer form no essential part of the instant invention, and canting plates or washers of known characteristics may be employed.

As will be described, the overall length of the shore is adjustable by mutually telescoping the lower tubular member 2 and the upper wooden member 1. At any adjustment the tubular member lies between the two wooden struts 4, as shown in Figs. 1 and 5 and is enclosed by or encircled within the braces 5 which will now be described. Each brace 5 comprises a horizontal web 51, two upwardly extended flanges 52 and two downwardly extending flanges 53 all preferably formed from a single piece of sheet metal. The flanges are secured to the wood struts 4 preferably by screw nails 54, the flanges 52 being secured to the inner opposite faces of the struts and the flanges 53 to the outer side edges of the struts as clearly shown in Figs. 1 to 4 inclusive. All of the webs 51 are provided with holes 55 through which the tubular member 2 passes and the upper end of the tubular member is tapered as at 56 to facilitate its entering the holes one after the other when the shore is shortened.

Figure 3:
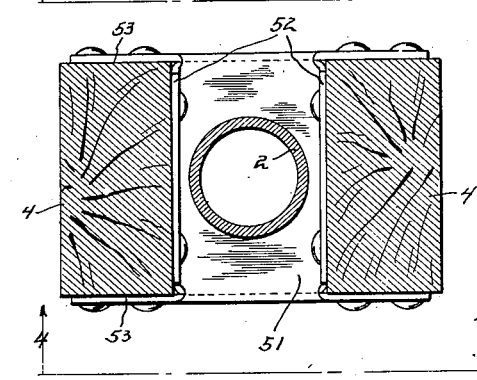
Fig. 3 is a view similar to Fig. 2 but taken from the plane 3—3 of Fig. 1.
Figure 4:
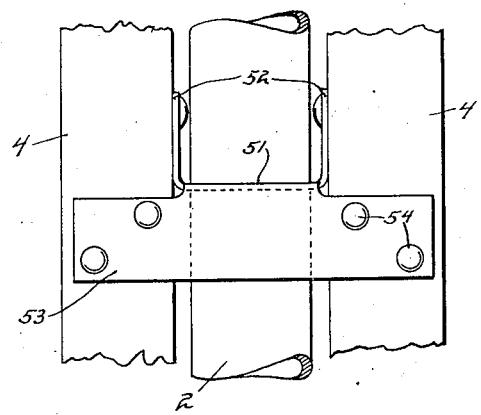
Fig. 4 is an elevational view of a part of Fig. 1 but drawn to a larger scale and, as illustrating the part shown in Figs. 2 and 3, may also be considered as taken from the plane 4 of those figures.

All of the braces serve to stiffen and strengthen the upper shore member by tying the two wooden struts together in the nature of a latticed column and the lowermost, or the two lowermost, as may be desired, perform an additional special and very important function which will now be described. Whereas the holes 55 of the other braces 5 are made of ample size to clear the tubular member 2 as shown at 55 in Fig. 2, the holes in the webs 51 of the lowermost brace or braces fit the tubular member 2 as closely and with as little clearance as is possible (as shown in Fig. 3), considering the variations in diameter of the tubular member 2 which will unavoidably occur and the departures thereof from a true cylinder. When commercial tube or pipe is used for sake of economy, a maximum clearance of six one-hundredths of an inch on the diameter is found to be suitable. For cooperation therewith the opening 21 in the upper housing portion 13 is made with this same small clearance. Now with the clearance in the holes 55 and 21 made as small as possible to still permit free movement of the tubular member therein for adjustment purposes, I find that the strength of a shore of given dimensions and material is enormously increased thereby. Experiment has shown that the added strength is due to the maintaining of the upper and lower shore members or the longitudinal axes thereof in axial parallelism or alignment with each other, that is, keeping the axis of the shore as a whole a substantially straight line.

The upper and lower shore members by being telescoped, overlap each other. To make the shore as a whole stiff and to keep the axis thereof straight, as above referred to, I have found it is not necessary to bind the upper and lower members together throughout their overlapped distance, but that to bind them together over a distance of one or two feet of overlap is as effective for all practical purposes in maintaining the axis straight as a greater distance. This fact or discovery permits me to provide close fitting holes 55 in the lower most brace or braces 5 only, and to provide large clearance holes in the other braces 5 and therefore, enables me to provide a shore of greater strength as a supporting column than any shore known heretofore involving the same amount of material and labor. In this connection it will be understood that to attempt to strengthen a shore by binding the two telescopic members together throughout their overlapped distance, as for example, by providing close fitting holes 55 in all of the braces 5 of the instant construction shore, would involve such difficulties of manufacture and entail such expense as to make such a shore impracticable; because special materials and special means in the upper shore member would be required to position and maintain all of the holes in alignment due to the variation of manufacture and assembly and the warping and twisting of the wood struts 4 due to natural causes as well as to their reactions under load. Preferably, therefore, the braces 5 having large clearance holes serve as braces only and not as guides. In the instant construction, the distance of overlap, throughout which the upper and lower shore members are bound together, is the distance between the close fitting hole 21 in the housing 3 and the close fitting hole in the lower most brace or braces 5. The number of braces 5 having close fitting holes is preferably one, and the distance thereof from the close fitting hole 21 may be chosen in view of the strength of shore desired, the maximum length to which the shore is to be extended, and the accuracy of workmanship permissible. I find that for the maximum clearance above mentioned a distance of 20″ is suitable for a shore which may be extended to a maximum length of fourteen feet.

The operation of the clutch device 3 above described to lengthen or shorten the shore by raising or lowering the upper shore member 1 will now be described.

When the shore is standing on the foot 8, the weight of the upper member 1 and any load that may be thereon is transmitted to the upper housing portion 13 and thence through the fulcrum 26 to the canting plate or washer 24 which, being in its canted position, grips the tubular member 2 and transmits the load to the latter. In view of the present development of this art it is deemed unnecessary to further describe in general the canting plate 24. If it be desired to lower the upper member 1, a pinch bar or like tool 35 is inserted through the opening 34 in the hook device 29, the one marked "Lower", the inner end of the bar engaging the bottom 33 of the lower housing member 14. The outer end of the bar 35 is then depressed and the hook device 29 is thereby drawn downwardly, thus uncanting the washer 24 and allowing the housing 13 and upper shore member 1 to slide downwardly by gravity on the lower shore member 2. If it be desired to raise the upper shore member 1, the operator may grasp it with his hands and lift it. The upward movement of the upper housing portion 13 thus occasioned carries the fulcrum 26 and shoulder 27 with it. Normally the removal of the load from the upper washer 24 by the movement of the fulcrum 26 will permit the spring 25 to break the grip of the washer 24 and it will freely slide upwardly on the tubular member 2, but if the washer 24 should tend to stick, the upward movement of the shoulder 27 will cause it to strike the washer 24 on its lower face 28 and loosen it. When the operator releases the upper shore member, the load is again taken up and held by the washer 24.

If it be desired to jack up the other shore member, or to accurately increase the shore length, a pinch bar or other tool 48 is inserted though the opening 47 in the hook device 42, the one marked "Raise", the inner end of the bar engaging the bottom of the housing portion 33. When the outer end of the bar 48 is depressed, the hook device 42 is pulled downwardly, the lip 43 rocks the washer 38 and cants it causing it to grip the tubular member 2; further depression of the bar 48 will cause it to rock upon the lower side or sill 56 of the opening 47 causing the inner end of the bar 48 to exert an upward thrust upon the housing 14 moving it and the upper shore member 1 upwardly. Upon releasing the bar 48 the load is taken up again and held upon the washer 24 and the washer 38 returns to its normal uncanted position. If the washer 38 should stick on the tubular member 2, the hook device 42 may be moved or knocked upwardly in any convenient manner as by the bar 48 which will cause the shoulder 44 to engage the washer 38 to break it loose.

It will be noted that the openings 34 and 47 in the hook devices when viewed by the operator in the assembled position present to his eye two doorways or receptacles, each marked with a legend "Raise" or "Lower" and he will need little or no instruction in the operation of raising or lowering the shore if he is given a rod, pinch bar or other like tool to operate it; and will, furthermore, inevitably operate it correctly, because the doorways 34 and 47 guide the end of the tool to the correct operating position therefor.

Besides the primary functions of the spring 25, washer 24 and fulcrum 26, above described, these parts may perform a secondary function as follows: When the shore is being transported from place to place it is sometimes placed in an upright position and supported or carried by means of that shore member of the pair which chances to be on top. At such times the unsupported shore member tends to fall by gravity and drop completely away from the other member. But in the construction which I employ and have described above, this may, at all times, be prevented by the friction set up between the tubular member 2 and the washer 24 caused by the normal canting of the washer due to the rocking of the washer on the fulcrum 26 by the spring 25. This friction can be made as great as necessary for this purpose by suitably selecting the spring 25 and yet not be great enough to noticeably increase the apparent weight of the upper shore member when it is lifted by the operator upon setting up the shore for use. When the spring 25 is selected to produce sufficient friction for this purpose, it may be necessary for the operator, when lifting the upper shore member in setting up the shore, to place his foot on the shore foot 8 to hold down the lower shore member 2.

I claim:

1. In an adjustable shore, two column members longitudinally overlapping each other, a mechanism for transferring to one member a load applied on the other member and operable to adjustably vary the overlapped distance of the two members to adjust the shore length, the said other shore member having a plurality, greater than two of axially spaced guide portions, two of which are relatively closely spaced and adjacent the overlapping end of the said other shore member for guiding the longitudinal movement of one member relative to the other, all of the guide portions respectively having spaced perforations embracing the one member; and the embraced member fitting the perforations of the said two guide portions sufficiently closely to effect a substantially uniform axial alignment of the two members at all adjusted lengths of the shore and the perforations being sufficiently close together to confine the guiding and aligning action to the said two perforated portions and to a relatively short longitudinal portion at the end of the said other member, and the perforations of the other guide portions being sufficiently large to clear the said embraced one member at all adjusted lengths of the shore.

2. In an adjustable shore, a wood column member comprising two generally parallel wood struts, a second column member comprising a metal tube arranged therebetween and disposed generally parallel therewith, the two column members longitudinally overlapping each other, a mechanism associated with the wood member for transferring to the tubular member a load applied to the wood member and the mechanism being operable to adjustably vary the overlapped distance of the two members to adjust the shore length, the wood member having a plurality, greater than two of spaced metal guide elements secured rigidly thereto, two of which are relatively closely spaced and disposed adjacent the overlapping end of the said wood member for guiding the longitudinal adjusting movement of one member relative to the other, all of the guide elements respectively having spaced perforations embracing the tubular member; and the tubular member fitting the perforations of the two guide elements sufficiently closely to effect a substantially uniform axial alignment of the two members at all adjusted lengths of the shore, and the perforations being sufficiently close together to confine the guiding and aligning action to the said two perforated elements and to a relatively short longitudinal portion at the end of the said wood member, and the perforations of the other guide element being sufficiently large to clear the tubular member at all adjusted lengths of the shore.

3. In an adjustable shore, two column members longitudinally overlapping each other, adjusting means for changing the overlap distance to change the over all length of the shore, said means comprising a mechanism adapted to be operated by a removable simple bar as a lever applied thereto, the mechanism being provided with a fulcrum upon which a side of the bar may be rocked and an abutment engageable by the lever when thus rocked to be moved by the lever to increase the length of the shore and provided with a second fulcrum on which a side of the bar may be rocked and a second abutment engageable by the lever when thus rocked to be moved thereby to cause the length of the shore to be decreased.

4. In an adjustable shore, two column members longitudinally overlapping each other, adjusting means for changing the overlap distance to change the over all length of the shore, said means comprising a mechanism adapted to be operated by a removable simple bar as a lever applied thereto, the mechanism being provided with a fulcrum upon which one side of the lever may be rocked by depressing the free end of the lever and an abutment engageable by the lever when thus rocked and movable by the lever to cause the length of the shore to be increased and provided with another fulcrum on which a side of the lever may be rocked by depressing the free end of the lever and another abutment engageable by the lever when thus rocked and movable thereby to cause the length of the shore to be decreased.

5. In an adjustable shore, two column members longitudinally overlapping each other, adjusting means for changing the overlap distance to change the over all length of the shore, said means comprising a mechanism adapted to be operated by a removable simple bar as a lever applied thereto, the mechanism being provided with a fulcrum upon which a side of the bar may be rocked and an abutment engageable by the lever when thus rocked to be moved by the lever to increase the length of the shore and provided with a second fulcrum on which a side of the bar may be rocked and a second abutment engageable by the lever when thus rocked to be moved thereby to cause the length of the shore to be decreased, and provided with two receptacle means into which the end of the lever may alternately be inserted for thus operatively increasing or decreasing the length of the shore.

6. In an adjustable shore, an upper and a lower column member longitudinally overlapping each other, adjusting means for changing the overlap distance to change the over all length of the shore, said means comprising a mechanism adapted to be operated by a removable bar as a lever applied thereto, the mechanism including a fulcrum member upon which a side of the lever may be rocked upon depressing the outer free end of the lever, means rigidly engageable with the lower column member and engaged with the fulcrum member to prevent relative movement of the fulcrum member axially of the said column member, an abutment for the lever on the upper column member and adapted to be moved by the lever when rocked to increase the length of the shore, a second fulcrum member upon which a side of the lever may be rocked upon depressing the outer free end thereof, operable means normally rigidly engaging the upper column member with the lower column member to adapt the upper column member to transmit a supported load to the lower column member, a second abutment for the lever on the upper column member, and means on the second fulcrum member and engageable with the normally rigidly engaging means whereby upon rocking the lever and second fulcrum member may be moved to disengage the two column members to permit the shore length to be decreased.

7. In an adjustable short, an upper and a lower column member longitudinally overlapping each other, adjusting means for changing the overlap distance to change the overall length of the shore, said means comprising a mechanism adapted to be operated by a removable bar as a lever applied thereto, the mechanism including a fulcrum member upon which a side of the lever may be rocked upon depressing the outer free end of the lever, means rigidly engageable with the lower column member, a first engaging means engaging the engageable means with the fulcrum member to prevent relative movement of the fulcrum member axially of the said column member, an abutment for the lever associated with the upper column member and adapted to be moved by the lever when rocked to increase the length of the shore, a second fulcrum member upon which a side of the lever may be rocked upon depressing the outer free end thereof, operable means for normally rigidly engaging the upper column member with the lower column member to adapt the upper column member to transmit a supported load to the lower column member, a second abutment for the lever on the upper column member, a second engaging means engaging the second fulcrum member and said normally engaging means whereby upon rocking the lever the second fulcrum member may be moved to disengage the two column members to permit the shore length to be decreased, said fulcrum members being provided with apertures into which the end of the lever may be inserted whereby the lever may be made to rock to operate the mechanism.

8. In a construction shore, a first and a second shore member, a canting plate normally canted and gripping the second shore member, a second canting plate supported in a normally uncanted position and movable to canted position to grip the second shore member, a first operating member in engagement with the first canting plate and movable to move the canting plate to uncanted position, a lever fulcrum on the operable member, a second operating member in engagement with the second canting plate and movable to cant the second canting plate, a lever fulcrum on the second operating member, each of the said fulcrums being positionally related to a portion of the first shore member so that an operating lever may be rocked alternatively on the said fulcrums and react upon the first shore member to alternately move the said operating members and their associated canting plates.

9. In a construction shore, a first and a second shore member, a canting plate normally canted and gripping the second shore member, a second canting plate supported in a normally uncanted position and movable to canted position to grip the second shore member, a first operating member in engagement with the first canting plate and movable to move the canting plate to uncanted position, a lever fulcrum on the operable member, a second operating member in engagement with the second canting plate and movable to cant the second canting plate, a lever fulcrum on the second operating member, each of the said fulcrums being positionally related to a portion of the first shore member so that an operating lever may be rocked alternatively on the said fulcrums and react upon the first shore member to alternately move the said operating members and their associated canting plates, and said operating members having lever receiving apertures, and a side of each aperture constituting a lever fulcrum.

10. In a construction shore, a first and second shore member, a canting plate, normally canted and gripping the second shore member, means for transmitting to the canting plate a load supported on the first shore member to thereby transmit the load to the second shore member, a second canting plate mounted in normally uncanted position and movable to canted position to grip the second shore member, a first operating member in engagement with the first canting plate and movable to uncant it, a second operating member in engagement with the second plate and movable to cant it, a fulcrum on each operating member upon which an operating lever may be rocked, the fulcrums being positionally related to a portion of the first shore member so that a lever rocked on the fulcrum of the second operating member may react on the first shore member to move the second canting plate to grip the second shore member and move the first shore member to lengthen the shore and a lever rocked on the fulcrum of the first operating member may react on the first shore member to uncant the first canting plate to permit the shore to be shortened.

11. In an adjustable shore, two column members longitudinally overlapping each other, adjusting means for adjusting the overlap distance to adjust the overall length of the shore, said means comprising a mechanism adapted to be operated by a removable simple bar as a lever applied thereto, the mechanism comprising means for normally preventing relative movement of the members in the direction to shorten the shore, and having a pair of guideways for effectively guiding the lever to two operating positions relative to the mechanism, and having a pair of fulcrums against which the side of the bar may be removably laid and upon one of which it may be rocked to operate the mechanism to increase the length of the shore and upon the other of which it may be rocked to operate the mechanism for shortening the shore.

12. In an adjustable shore, two column members longitudinally overlapping each other, adjusting means for adjusting the overlapped distance to increase the overall length of the shore, said means comprising a mechanism adapted to be operated by a removable simple bar as a lever applied thereto, the mechanism having a guideway for effectively guiding the lever to its operating position relative to the mechanism, and provided with a fulcrum on which the side of the bar may be removably laid and upon which it may be rocked to operate the mechanism, a normally uncanted canting plate embracing one column member, and means associated with the canting plate and movable by the lever when rocked to cant the plate into gripping engagement with the embraced member to cause the plate to act as a reaction point on which, upon further rocking movement of the lever, the lever may act upon the other shore member to move it to increase the shore length.

13. In an adjustable shore, two column members longitudinally overlapping each other, adjusting means for adjusting the overlapped distance to shorten the overall length of the shore, said means comprising a mechanism adapted to be operated by a removable simple bar as a lever applied thereto, the mechanism comprising means for normally preventing relative movement of the members in the direction to shorten the shore, and said mechanism having a guideway for effectively guiding the lever to its operating position relative to the mechanism and having a fulcrum against which a side of the bar may be removably laid and upon which it may be rocked to operate the mechanism, to release the said preventing means.

14. In an adjustable shore, two column members longitudinally overlapping each other, a mechanism for adjusting the overlapped distance to change the overall length of the shore, the mechanism comprising a canting plate normally canted and gripping one shore member, a second canting plate normally uncanted and adapted to be canted to grip the said one shore member, a mechanism housing connected to the other shore member, an abutment in the housing engaging the canted plate to transfer the load of the said other shore member thereto, a spring in the housing surrounding the one member and reacting upon the canted plate tending to maintain it in canted position, a device having a portion engaging the canted plate and extending outwardly through an opening provided in the housing and provided with an external perforation through which a lever may be inserted and engaged with a portion of the housing whereby the lever when rocked may move the device to cant the plate to permit the shore to be shortened, a second spring surrounding the one member and reacting on the uncanted plate tending to maintain it in uncanted position, a second device having a portion engaging the uncanted plate and extending outwardly through an opening provided in the housing and provided with an external perforation through which a lever may be inserted and engaged with a portion of the housing whereby the lever when rocked may cant the plate to cause it to grip the one member and may react upon the housing to increase the length of the shore.

15. In an adjustable shore, two column members longitudinally overlapping each other, a mechanism for adjusting the overlapped distance to change the overall length of the shore, the mechanism comprising a canting plate normally canted and gripping one shore member, a mechanism housing connected to the other shore member, an abutment in the housing engaging the canted plate to transfer the load of the other shore member thereto, a spring surrounding the one member and engaging the canted plate tending to maintain it in canted position, a device having a portion engaging the canted plate and extending outwardly through an opening provided in the housing and provided with an external perforation through which a lever may be inserted and engaged with the housing and whereby the lever when rocked may move the device to cant the plate to permit the shore to be shortened.

16. In an adjustable shore, two column members longitudinally overlapping each other, a mechanism for adjusting the overlapped distance to change the overall length of the shore, the mechanism comprising a canting plate normally uncanted and adapted to be canted to grip one of the members, a spring surrounding the member and reacting upon the uncanted plate tending to maintain it in uncanted position, a device having a portion engaging the uncanted plate and extending outwardly through an opening provided in the housing and provided with an external perforation through which a lever may be inserted and engaged with the housing and whereby the lever when rocked may move the device to cant the plate to cause it to grip the said member and may react upon the housing to move the other shore member to lengthen the shore.

17. In a shore, upper and lower longitudinally relatively movable members, two canting plates surrounding the lower member and rotatable around a longitudinal shore axis relative to both members and adapted to grip the lower member when canted, one of said plates being normally uncanted, the other plate being normally canted and engaged by the upper member to support the latter, a lever receptacle associated with each plate, a bar adapted to have one end thereof inserted as a lever into either of the receptacles and the outer end thereof depressed to respectively uncant the canted plate to permit the shore to be shortened or cant the uncanted plate and apply force thereon for lifting the upper member to lengthen the shore.

RALPH R. ROEMER.